United States Patent

Honda

Patent Number: 6,124,950
Date of Patent: Sep. 26, 2000

[54] APPARATUS AND METHOD FOR DETECTING BOOK DOCUMENT ALONG THE LONGITUDINAL EDGE

[75] Inventor: Takashi Honda, Toyokawa, Japan

[73] Assignee: Minolta Co., Ltd., Osaka, Japan

[21] Appl. No.: 09/060,652

[22] Filed: Apr. 15, 1998

[30] Foreign Application Priority Data

Apr. 15, 1997 [JP] Japan ................................. 9-097254
Apr. 1, 1998 [JP] Japan ............................... 10-088588

[51] Int. Cl.[7] .............................. H04N 1/04; H04N 1/38; G06K 9/48; G06K 9/46; G06K 9/30
[52] U.S. Cl. ...................... 358/474; 358/488; 358/464; 358/493; 358/494; 358/497; 382/199; 382/195; 382/316
[58] Field of Search ................................. 358/474, 475, 358/488, 464, 463; 382/199, 266, 165, 181, 190

[56] References Cited

U.S. PATENT DOCUMENTS

| | | | |
|---|---|---|---|
| 5,084,611 | 1/1992 | Okisu et al. | 250/208.1 |
| 5,377,019 | 12/1994 | Okisu et al. | 358/464 |
| 5,416,609 | 5/1995 | Matsuda et al. | 358/474 |
| 5,463,697 | 10/1995 | Toda et al. | 382/199 |
| 5,610,720 | 3/1997 | Fujioka et al. | 358/296 |
| 5,677,776 | 10/1997 | Matsuda et al. | 358/475 |
| 5,805,272 | 9/1998 | Nozawa et al. | 355/25 |
| 5,886,342 | 3/1999 | Matsui | 250/208.1 |
| 6,011,635 | 1/2000 | Bungo et al. | 358/488 |

FOREIGN PATENT DOCUMENTS

| | | |
|---|---|---|
| 5-336341 | 12/1993 | Japan . |
| 6-205194 | 7/1994 | Japan . |
| 6-326865 | 11/1994 | Japan . |

*Primary Examiner*—Edward L. Coles
*Assistant Examiner*—Coulter Henry
*Attorney, Agent, or Firm*—Sidley & Austin

[57] ABSTRACT

An image reading apparatus is disclosed which reads from above a book document mounted as opened upwardly. This image reading apparatus decides the positions of face terminal parts of the document by detecting longitudinal edges in accordance with differences in luminance contrasts which occur in the face part of document and the lateral face part of document in the lateral direction of an image and further detecting the pattern of longitudinal edges due to the overlap of pages in the lateral face part of document and the amount of change of the position of the upper side edge of the document. The apparatus, therefore, is capable of accurately detecting the face of the document and the lateral face of the document and producing exclusively the image of the face of the document in spite of the presence of an index, a pattern of black frame, or a black background in the terminal parts of the face of the document.

48 Claims, 10 Drawing Sheets

END OF DOCUMENT    DETECTION STARTING POSITION    CENTRAL POSITION OF DOCUMENT

PRESCRIBED AMOUNT

COORDINATE FOR STARTING DETECTION

| -1 | 0 | 1 |
|---|---|---|
| -1 | 0 | 1 |
| -1 | 0 | 1 |

APPARATUS AND METHOD FOR DETECTING BOOK DOCUMENT ALONG THE LONGITUDINAL EDGE

BACKGROUND OF THE INVENTION

1. Field of the Invention

This invention relates to an apparatus and method for reading an image, and particularly to an image reading apparatus and method for reading from above a document so mounted as to show its face upwardly.

2. Description of Related Art

Among conventional image reading apparatuses is counted one that is adapted to detect the boundary between a document placed on a document stand and the face of the document stand and yield as an output an image of the document less the area irrelevant thereto.

When such a document as a book of appreciable thickness (hereinafter referred to as "book document") is opened at a page containing a relevant image and this book document is read in the apparatus of the principle mentioned above, however, since this apparatus inevitably reads the lateral parts of the page opposed across the image part of the book document additionally as part of the document, the image yielded contains the irrelevant image of such lateral parts of the page and offers an unpleasant appearance.

As an approach to the elimination of the image of such lateral parts of the book document for the purpose of improving the appearance of the yielded image, JP-A-06-3, 236,865, for example, discloses an image reading apparatus which is adapted to effect the elimination of the image of lateral parts of the document by discerning the area of lateral parts of the document in virtue of the fact that the luminance of the lateral parts of the document is lower than that of the face part of the document.

The image reading apparatus resorting to the principle of reading from above a book document which is mounted as opened upwardly, however, has the problem of encountering difficulty in discerning between a difference of luminance due to a curve in the face part of a document and a difference of luminance between the face part of a document and the lateral part of a document because the face part of the document is curved.

Further, when the part of the face of the document which borders on the lateral faces of the document happens to contain an index, a pattern of black frame, or a black background, the apparatus has the problem of failing to discern satisfactorily between such special marks and the lateral parts of document.

SUMMARY OF THE INVENTION

It is, therefore, an object of this invention to provide, as an image reading apparatus and method for reading from above a book document mounted as opened upwardly, an image reading apparatus and method capable of clearly distinguishing an index, a pattern of black frame, or a black background from the lateral parts of a document thereby detecting precisely the face part of the document and yielding exclusively a necessary image of the document as an output.

According to an aspect of the invention, an image reading apparatus for reading a book document mounted on a document stand as opened upward comprises an image reading device for reading the document mounted on the document stand and producing an image as an output, a memory device for storing the output image, a longitudinal edge detecting device for detecting a longitudinal edge in the stored image, a pattern detecting device for detecting a prescribed pattern formed by the detected longitudinal edge, and an image reading area deciding device for deciding an area to be read by the image reading device based on the detected pattern.

According to another aspect of the invention, an image reading apparatus for reading a book document mounted on a document stand as opened upward comprises an image reading device for reading the document mounted on the document stand and producing an image as an output, a memory device for storing the output image, an upper and lower edge detecting device for detecting in the memorized image such an edge as corresponds to the upper side edge or lower side edge of the book document, a change point detecting device for detecting a point of change in the detected edge, and an image reading area deciding device for deciding an area to be read by the image reading device based on the detected point of change.

According to still another aspect of the invention, an image reading apparatus for reading a book document mounted on a document stand as opened upward comprises an image reading device for reading the document mounted on the document stand and producing an image as an output, a memory device for storing the output image, and a boundary detecting device for detecting from the memorized image a boundary between a face part and a lateral face part of the book document, wherein the boundary detecting device is provided with a longitudinal edge detecting device for detecting a longitudinal edge in the memorized image and a pattern detecting device for detecting a prescribed pattern formed by the detected longitudinal edge and adapted to detect the boundary between the face part of document and the lateral face part of document based on the detected pattern.

According to a further aspect of the invention, an image reading apparatus for reading a book document mounted on a document stand as opened upward comprises an image reading device for reading the document mounted on the document stand and producing an image as an output, a memory device for storing the output image, and a boundary detecting device for detecting from the memorized image, a boundary between a face part and a lateral face part of the book document, wherein the boundary detecting device is provided with an upper and lower edge detecting device for detecting from the memorized image such an edge as corresponds to the upper side edge or the lower side edge of the book document and a change point detecting device for detecting a point of change in the detected edge and is adapted to detect the boundary between the face part of document and the lateral face part of document based on the detected point of change.

According to a still further aspect of the invention, a method for reading an image of a book document mounted on a document stand as opened upwardly comprises the steps of reading the document mounted on the document stand and producing an image as an output, memorizing the output image, detecting a longitudinal edge in the memorized image, detecting a prescribed pattern formed by the detected longitudinal edge, and deciding an area to be read by an image reading device based on the detected pattern.

According to a yet further aspect of the invention, a method for reading an image of a book document mounted on a document stand as opened upwardly comprises the steps of reading the document mounted on the document stand and producing an image as an output, memorizing the output image, detecting in the memorized image such an edge as corresponds to the upper side edge or lower side edge of the book document, detecting a point of change in the detected edge, and deciding an image reading area based on the detected point of change.

According to a yet further aspect of the invention, a method for reading an image of a book document mounted on a document stand as opened upwardly comprises the steps of reading the document mounted on the document stand and producing an image as an output, memorizing the output image, detecting a longitudinal edge in the memorized image, detecting a prescribed pattern formed by the detected longitudinal edge, and detecting a boundary between a face part and a lateral face part of the book document based on the detected pattern.

According to a yet further aspect of the invention, a method for reading an image of a book document mounted on a document stand as opened upwardly comprises the steps of reading the document mounted on the document stand and producing an image as an output, memorizing the output image, detecting from the memorized image such an edge as corresponds to the upper side edge or the lower side edge of the book document, detecting a point of change in the detected edge, and detecting a boundary between a face part and a lateral face part of the book document based on the detected point of change.

In one aspect, this invention contemplates detecting an inclined lateral face part of a book document produced when the book document is opened as an edge pattern having longitudinal stripes appear characteristically in the longitudinal direction and, therefore, allows accurate detection of a face of the document and a lateral face of the document and permits exclusive production of the necessary surface image of the document as an output in spite of the presence of an index, a pattern of black frame, or a black background in the terminal parts of the face of the document.

In another aspect, this invention contemplates detecting the terminal parts of the face of a book document based on the amount of change in the upper or lower side edge in the face part of the document and the lateral face part of the document which is inclined when the book document is opened and, therefore, allows accurate detection of a face of the document and a lateral face of the document and permits exclusive production of the necessary surface image of the document as an output in spite of the presence of an index, a pattern of black frame, or a black background in the terminal parts of the face of the document.

DESCRIPTION OF THE PREFERRED EMBODIMENTS

Now, the mode of embodying this invention will be described below with reference to the drawings annexed hereto.

Figure 1:
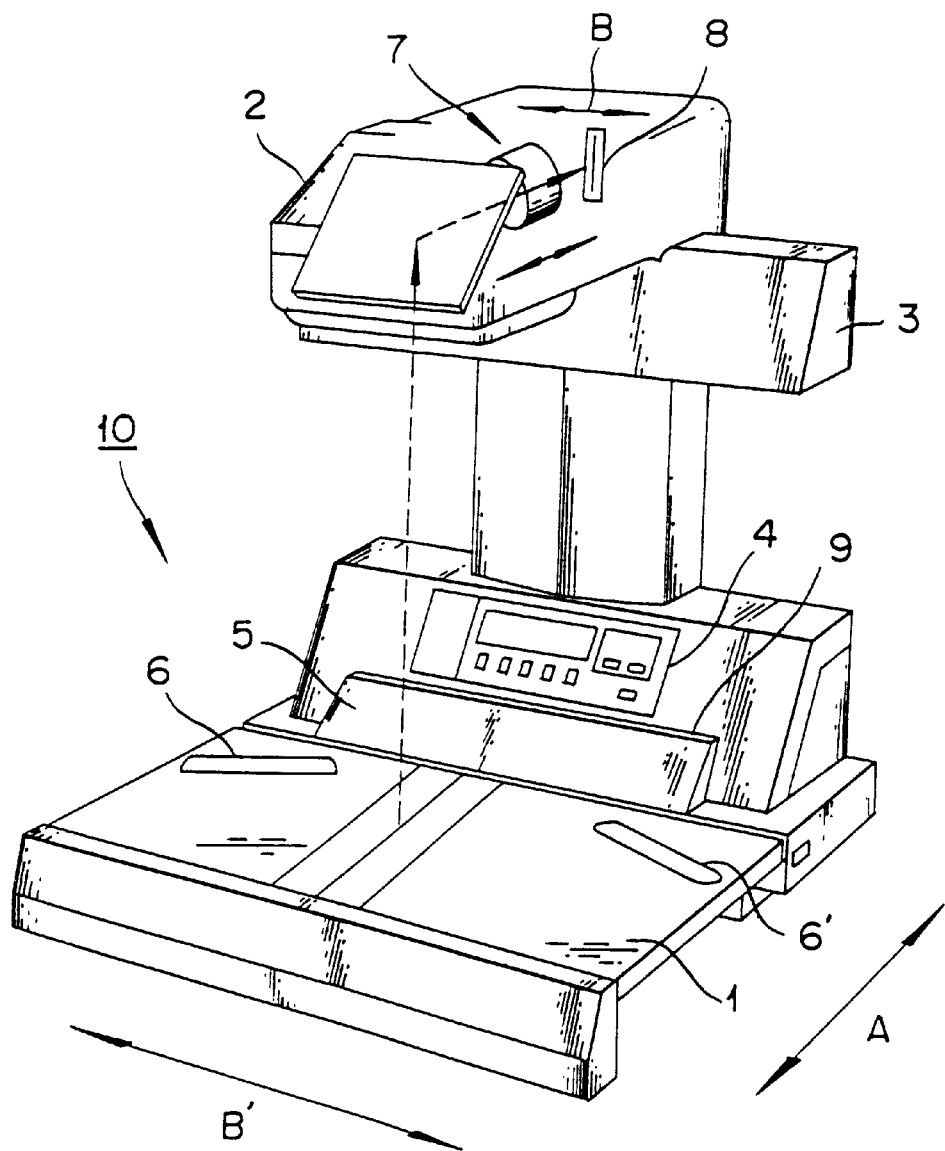
FIG. 1 is a perspective view illustrating the overall construction of a book document reading apparatus embodying the present invention.

FIG. 1 is a perspective view to aid in the description of the overall construction of a book document reading apparatus embodying this invention.

A book document reading apparatus (hereinafter referred to briefly as "reading apparatus") 10 is provided with a document stand 1 divided into two lateral segments which are vertically movable independently of each other. A book document which is mounted on the document stand 1 as opened upwardly is illuminated by an illuminating part 3 and read out by a CCD line sensor 8 in a camera part 2 through the medium of an optical system 7.

During the reading of the image of this document, the upper end face of the book document which is reflected on a mirror 5 is also read out by the CCD line sensor 8 in the camera part 2. Then, the height of the document is detected based on a shape of the upper end face of the document read out as described above. The height of the document thus detected is used for adjusting the focus in the camera part 2 and correcting a distortion, if any, in the image read out. The image of the book document free from distortion is finally obtained in consequence of the adjustment of focus and the correction of distortion of the image.

The document stand 1 of this reading apparatus 10 is fitted on the left and right sides thereof respectively with start keys 6 and 6' adapted to start image reading. The start keys 6 and 6' are so disposed that the operator may be enabled to start the apparatus in an image reading operation while keeping the opposite edges of the book document held down in his hands for the purpose of allowing the book document to remain in an opened state. The document stand 1 is provided in a recess thereof with an operating panel 4 adapted to permit various settings.

The CCD line sensor 8 is disposed in the camera part 2 in such a manner that the photoelectric conversion elements thereof may be arrayed along the main scanning direction (direction indicated by an arrow mark A in FIG. 1) relative to the document stand 1 and it is moved in the auxiliary scanning direction (direction indicated by an arrow mark B in FIG. 1; direction indicated by an arrow mark B' in the diagram relative to the document stand 1) by the drive of a motor which is not shown in the diagram.

A shading plate 9 is disposed along the auxiliary scanning direction above the mirror 5. This shading plate 9 is formed of a white plate possessing a fixed density. An uneven illumination such as a flicker, which is caused by an external light in the auxiliary scanning direction is recognized from the output signal which the CCD line sensor 8 produces on reading the shading plate 9. The image output is corrected so as to eliminate the uneven illumination.

Figure 2:
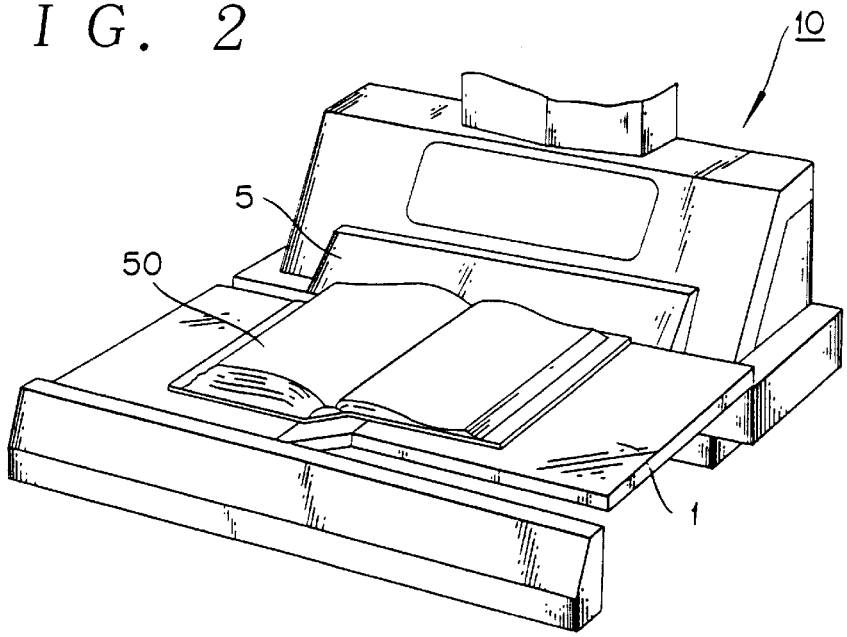
FIG. 2 is a perspective view illustrating the apparatus mentioned above in a state having a book document as an object for reading mounted in position.

A book document 50 is mounted on the document stand 1 in an opened state as illustrated in FIG. 2. By vertically moving the lateral segments of the document stand 1 independently of each other, the faces of the laterally opposite pages of the book document 50 can be placed with substantially same level.

Figure 3:
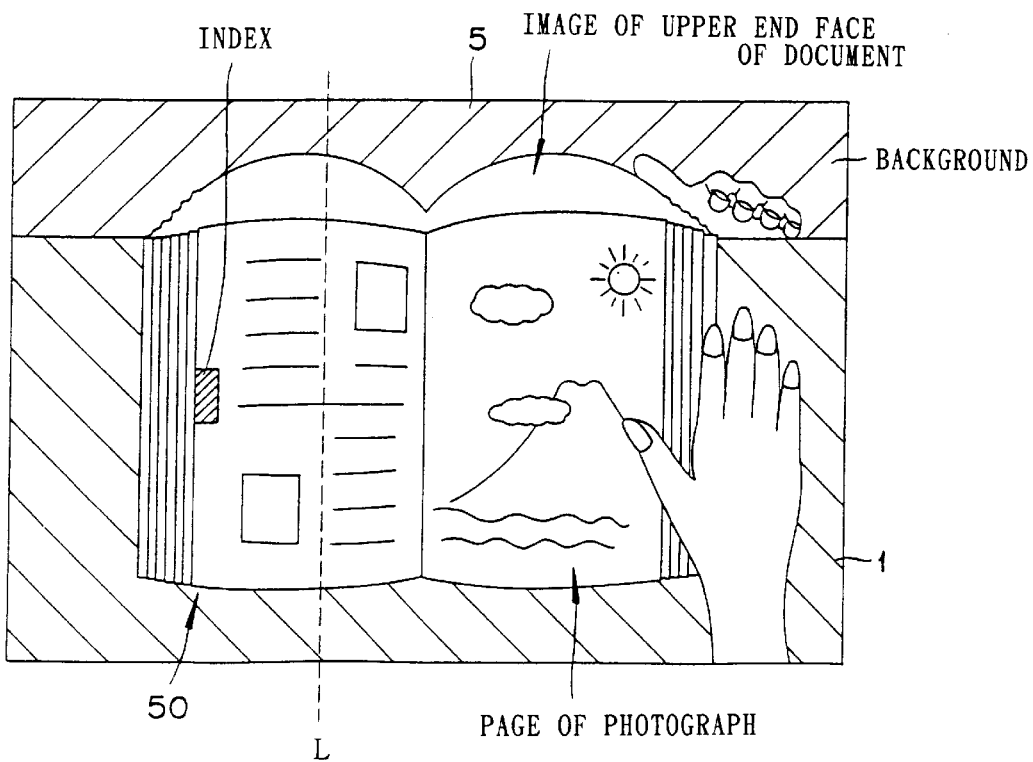
FIG. 3 is a diagram to aid in the description of an area to be read by a CCD line sensor of the apparatus mentioned above.

FIG. 3 depicts one example of the image for reading produced when the book document 50 is mounted on the document stand 1. The area for reading additionally embraces the document stand 1 and the mirror 5 as illustrated in the diagram. An upper end face of the book document 50 is reflected on the mirror 5. The face part of the document forms an image of high luminance because it has a white or bright background, whereas the part of the document stand 1 forms an image of low luminance because it has a dark color. The part of the mirror 5 which corresponds to the upper end face of the document forms an image of high luminance because the upper end face of the document reflects the illuminating light. The image of the background part excluding the upper end face of the document has low luminance because this part does not reflect the illuminating light.

Figure 4:
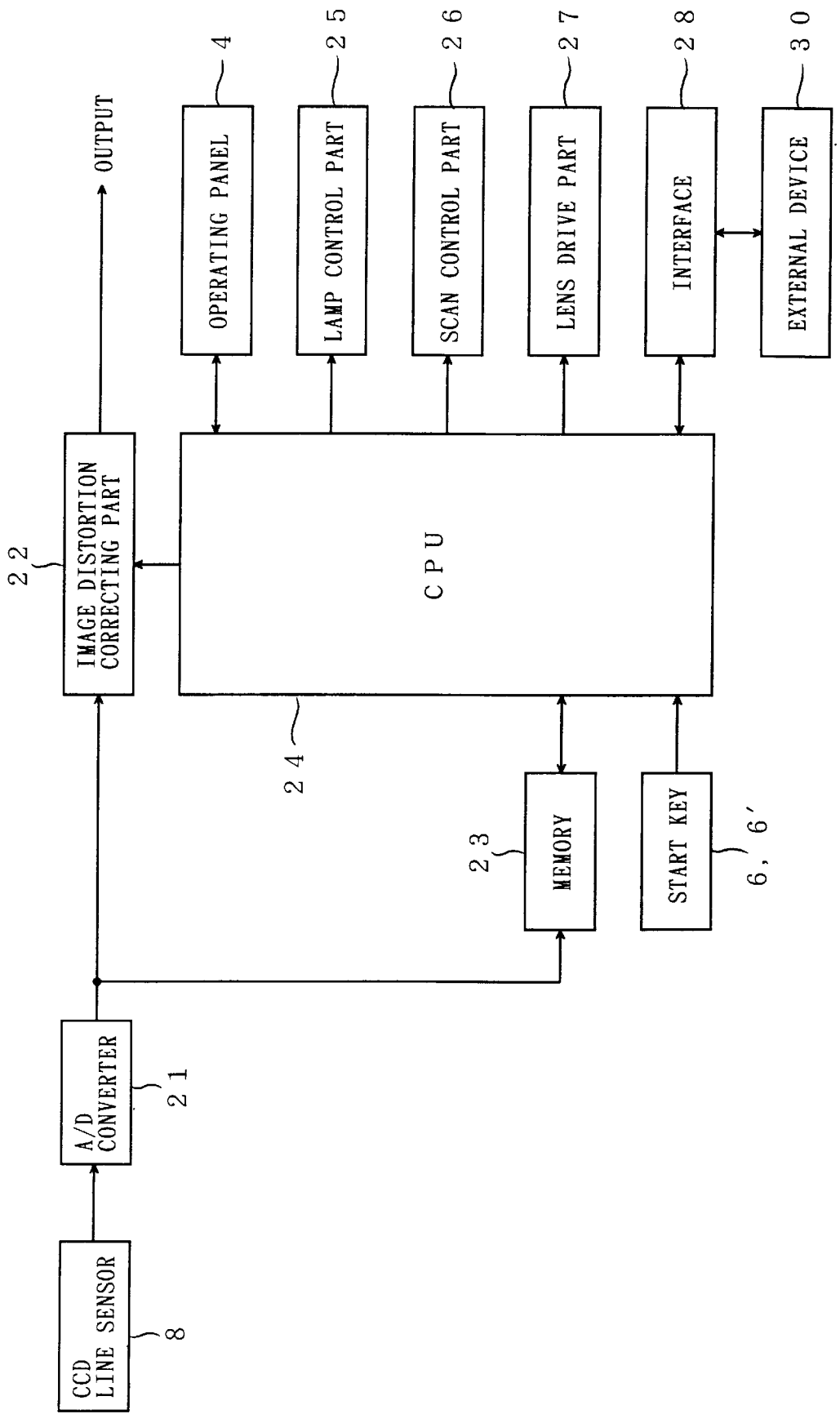
FIG. 4 is a block diagram of the control system of the apparatus mentioned above.

FIG. 4 is a block diagram to aid in the description of the control system of the reading apparatus 10.

The analog image data emitted from the CCD line sensor 8 is converted in an A/D converter 21 into a digital image data. The image data thus converted in the A/D converter 21, in the process of preliminary scanning, is stored in a memory 23 one line at a time in the main scanning direction. The image data, in the process of actual scanning, is emitted via an image distortion correcting part 22 to an external device such as a printer or personal computer.

A CPU 24 is intended for governing the control of the apparatus in its entirety. From the image stored in the memory 23 during the preliminary scanning, the CPU 24 computes the height distribution of document, document size, position of a finger or hand holding the document in a pressed state, and image reading area in which the image is actually produced during the actual scanning, then computes therefrom the data of height of the face of document, data for the control of automatic focussing (AF), data of the document reading area, and coefficient for the correction of image distortion, and causes these data to be stored in the relevant data areas of the memory 23 (areas different from the area for memorizing the image). In the process of actual scanning, the CPU 24 relies on these data for information required for controlling the relevant parts to form an adequate image of the document.

Thus, to the CPU 24 are connected a lamp control part 25 for controlling the ON-OFF status and the luminous energy of a lamp of the illuminating part 3, a scan control part 26 for moving the CCD line sensor 8 in the auxiliary scanning direction by the drive of the motor not shown in the diagram, a lens drive part 27 for driving the lens of the optical system 7 for adjusting focus in the camera part 2, and an image distortion correcting part 22 for correcting a distortion of the image read out by using a given coefficient for correcting distortion besides the start keys 6 and 6' and the operating panel 4 mentioned above. The CPU 24 checks the conditions of the start keys 6 and 6' and the operating panel 4, controls the ON-OFF status and the luminous energy of the lamp of the illuminating part 3 through the medium of the lamp control part 25, and instructs the scan control part 26 to move the CCD line sensor 8 in the auxiliary scanning direction. In the process of actual scanning, the CPU 24 reads out of the memory 23 various kinds of data secured during the preliminary scanning mentioned above for the purpose of controlling the lens drive part 27 and consequently the AF motion or transmitting the coefficient for the correction of distortion to the image distortion correcting part 22 thereby correcting the document in position and size or performing the shading correction mentioned above.

An interface 28 for transferring signals to and from an external device (such as a printer or personal computer) 30 is also connected to the CPU 24. Through the medium of this interface 28, the CPU 24 transfers to and from the external device 30 such control signals as are used for the transfer of image data. This interface 28 is capable of bidirectional communication. For example, such communication grade interfaces as serial interface, parallel interface, Ethernet, and LAN are usable for the interface 28.

Figure 5:
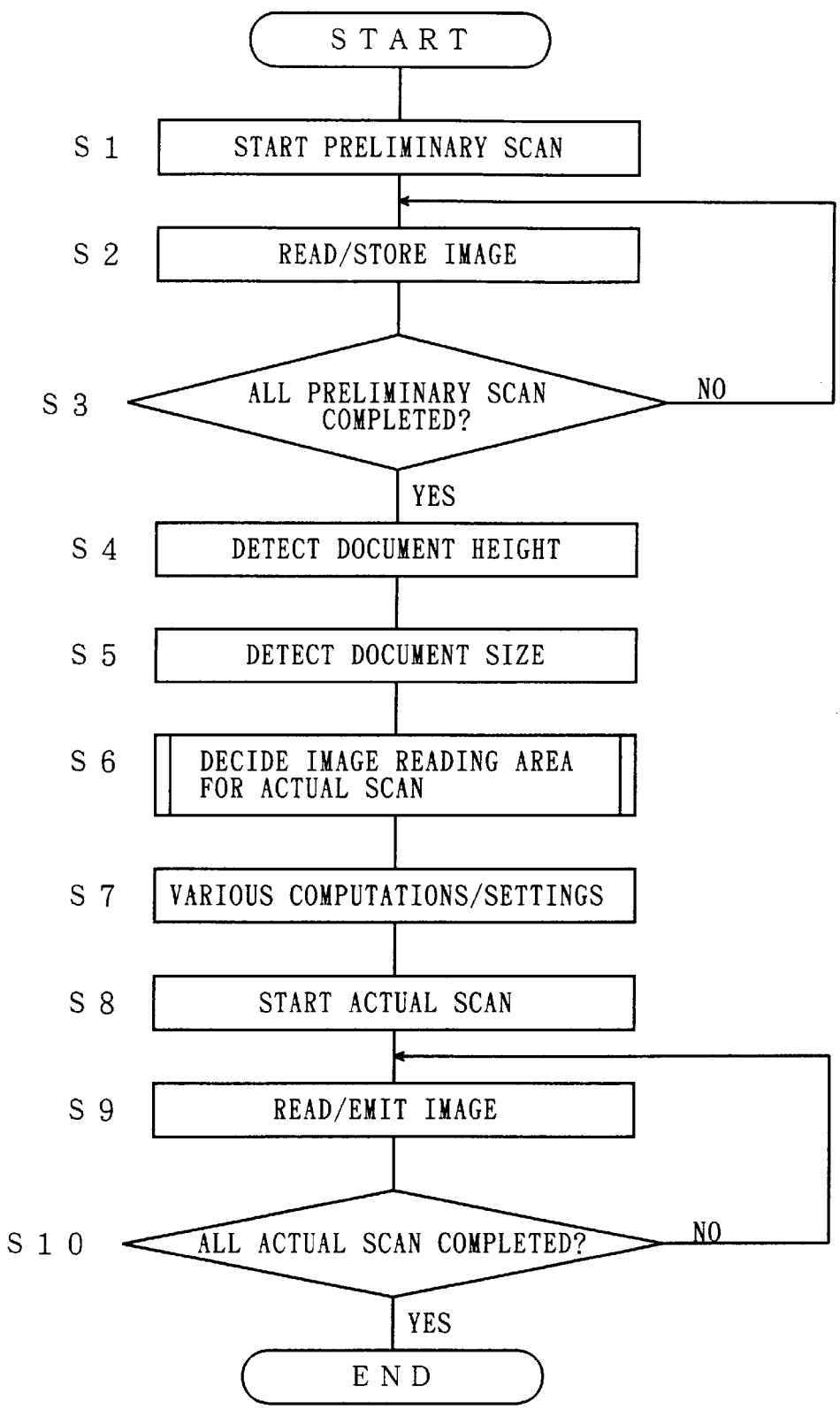
FIG. 5 is a flow chart illustrating the procedure of processing of document reading in the apparatus mentioned above.

FIG. 5 is a flow chart showing the control of the reading motion by the CPU 24.

First, the preliminary scan for detecting the height distribution of the document, the document size, and the position of a finger or hand holding the document in a pressed state is started (S1). In this preliminary scan, the reading pitch in the auxiliary scanning direction is coarse as compared with the reading pitch in the actual scan. It is set approximately at 1 mm in the mode of the present embodiment. At S2, one line read in the main scanning direction by the preliminary scan is stored in the memory 23. Subsequently, the question whether or not the preliminary scan has read/stored all the lines is decided (S3). When the answer is in the negative (S3, NO), the flow of the process is returned to S2, wherein the next one line is read/stored. When the answer is in the affirmative (S3, YES), the flow of process is advanced to S4.

Based on the image data stored in the memory 23, the height distribution of document is detected at S4, the document size is detected at S5, the processing for deciding the image reading area for the actual scan is effected at S6, and various computations and settings are sequentially executed at S7.

Subsequently, the actual scan is started (S8) and one line is read/emitted in the main scanning direction (S9) based on the outcomes of the detections and computations at S4–S7 mentioned above. Then, the question whether or not the actual scan has read/emitted all the lines is decided (S10). When the answer is in the negative (S10, NO), the flow of processing is returned to S9, wherein the next one line is read/emitted. When the answer is in the affirmative (S10, YES), the image reading operation is completed.

The detection of the document height (S4) and the detection of the document size (S5) shown in FIG. 5 will be described with reference to FIG. 6 and FIG. 7.

Figure 6:
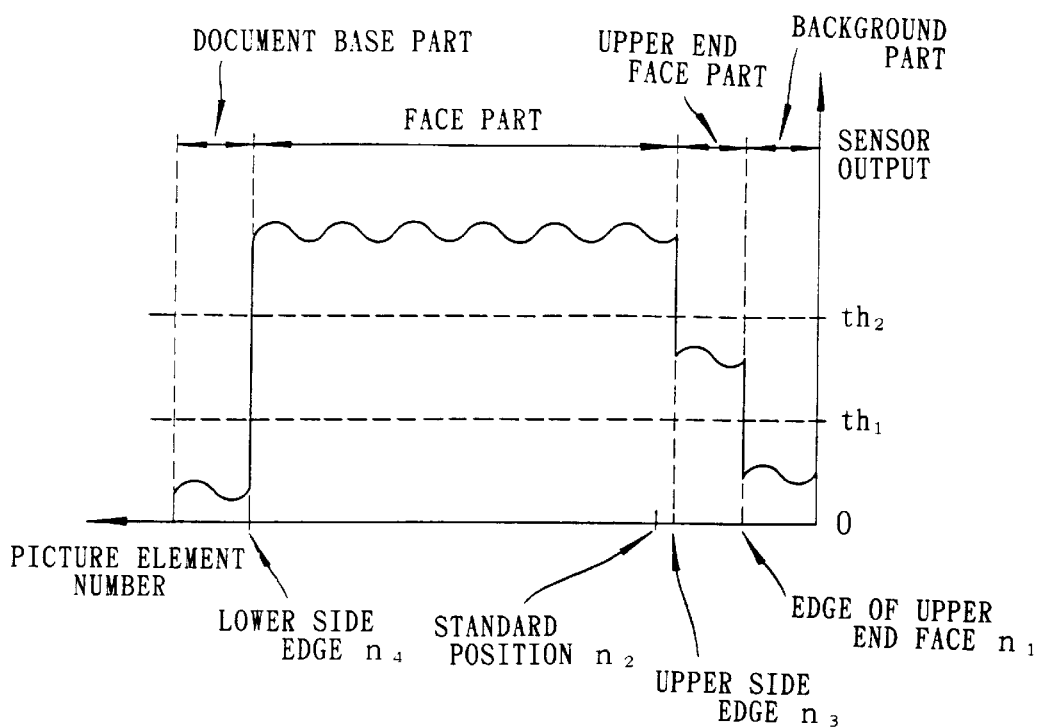
FIG. 6 is a diagram illustrating an example of the output in the main scanning direction of the CCD line sensor of the apparatus mentioned above.
Figure 7:
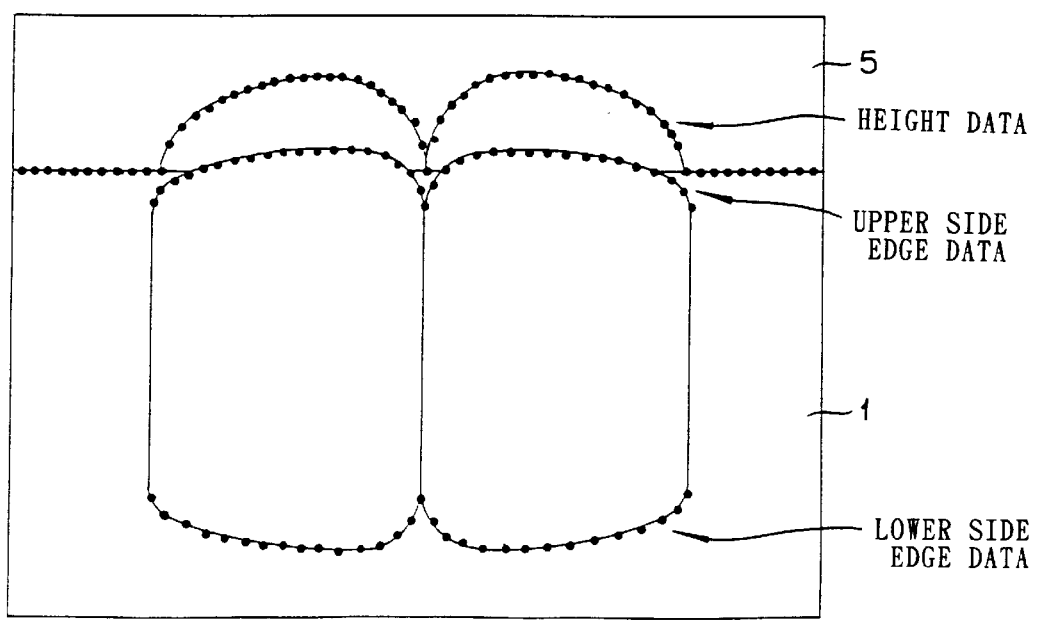
FIG. 7 is a diagram illustrating an image depicting the detection of an edge based on an image produced in a preliminary scan by the apparatus mentioned above.

FIG. 6 illustrates the output image of the CCD line sensor 8 for one line in the main scanning direction indicated by a broken line L in FIG. 3. In the diagram, the vertical line is the scale of the output of the CCD line sensor 8 and the horizontal line the scale of the position of the picture element in the main scanning direction. From the right end forward, the images of the background part of the mirror 5, the upper end face part of document reflected on the mirror 5, the face part of the document, and the document base part are produced. The outputs of the images of the background part and the document base part are low and the outputs of the images of the upper end face part of document and the document face part are high. In the diagram, the symbol th, represents the prescribed threshold for discerning between the image of the face of the document and the rest of the image and the symbol $th_2$ represents the prescribed threshold for discerning between the image of the upper end face of the document and the image of the face of the document.

The edge $n_1$ of the upper end face is the value of the smallest address of the picture element exceeding $th_1$, the upper side edge $n_3$ of the face of the document is the value of the smallest address of the picture element exceeding $th_2$, and the lower side edge $n_4$ represents the value of the largest address of the picture element exceeding $th_1$. The standard position $n_2$ is a fixed value indicating the position of the boundary between the document stand 1 and the mirror 5. The document is mounted on the document stand 1 in such a manner that the upper end face thereof may coincide with the standard position $n_1$.

The height of the document of the line in FIG. 6, therefore, can be found from the number of picture elements $(n_2-n_1)$ from the standard position $n_2$ to the edge $n_1$ of the upper end face. The distribution of the height of the document is obtained by finding the heights of the document sequentially in the lines of the auxiliary scanning direction. The height distribution is stored in the memory 23 in conjunction with the positions in the auxiliary scanning direction.

The document size in the main scanning direction is obtained by finding the numbers of picture elements from the lower side edge $n_4$ to the upper side edge $n_3$ $(n_4-n_3)$ with respect to the lines of scanning.

As respects the detection of the document size in the auxiliary scanning direction, since the upper side edge and the lower side edge mentioned above are gently varied in the part in which the book document is present whereas they are no longer detected in the part in which the book document is absent, the position in the auxiliary scanning direction at which the continuity of the change terminates is detected as the end edge of the document (both left and right side).

The document size which is detected herein includes the lateral face part of the document, whereas the image reading area during the actual scan which will be mentioned hereinafter is the result of deduction of the left and right lateral face parts of the document from the document size.

The process of deciding the image reading area (S6) during the actual scan of FIG. 4 will be described below with reference to FIG. 8 through FIG. 15.

The lateral face part of the document must be discerned for the purpose of removing the lateral face part of the document from the document size found at S5 of FIG. 4. In the present embodiment, the discrimination between the lateral face part of the document and the face part of the document is accomplished by detecting a plurality of continuous longitudinal edges which exist in the lateral face part of the document along the direction of the main scanning.

The detection of the longitudinal edges will be described specifically below. By way of initialization, the coordinates of the position for starting the detection of longitudinal edges in the main scanning direction are set. In the present embodiment, the position about 10 mm inward from the upper side edge slightly toward the lateral face from the center of the opposite pages of the document is selected for the purpose of setting the coordinates for starting the detection. In the case of the standard letter document, the area falling generally in this neighborhood is often a blank area. The coordinates which are set as described above, therefore, serve the purpose of enabling the detection of the longitudinal edges to avoid a possible error caused by the presence of an image such as a letter or a figure on the document.

After the position for starting the detection has been decided, the filter processing for detecting longitudinal edges is effected on the image data obtained by the preliminary scanning in the direction of the lateral face of the document. In this case, this filter processing for detecting longitudinal edges can be carried out even when the book document held in an opened state produces a curve in the upper side edge thereof because the coordinates of the motion of the filter in the main scanning direction during the filter motion set the position for starting the detection toward the inside from the upper side edge as mentioned above.

Figures 8, 9:
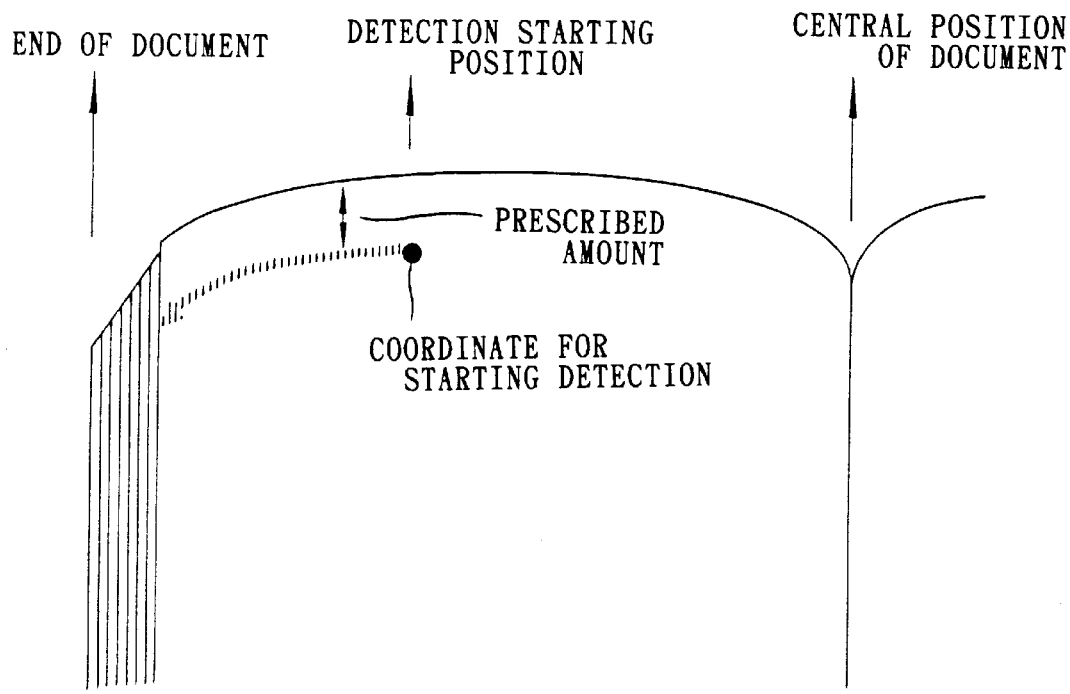
FIG. 8 is a diagram to aid in the description of the position for starting detection of a longitudinal edge in the apparatus mentioned above.
FIG. 9 is a diagram to aid in the description of a longitudinal edge detecting filter in the apparatus mentioned above.

FIG. 9 depicts a longitudinal edge detecting filter to be used for the detection of longitudinal edges. This filter is stored in the memory 23. The longitudinal lines in the image are detected by subjecting this image in the process of preliminary scanning to primary differential by the use of a filter of 3×3 matrix. This filter reacts with a longitudinal edge which has produced a difference of luminance contrast in the auxiliary scanning direction. It may be safely concluded that the difference in luminance contrast occurring in an image in the auxiliary scanning direction increases in accordance as the numerical value obtained by the primary differential increases.

When the filter for the detection of the longitudinal edges is moved in address from the position for starting the detection toward the end part of the document in the auxiliary scanning direction until the position corresponds to a picture element of a interest on the filter for the detection of the longitudinal edges at which the value of differential reaches a level exceeding the prescribed threshold. This position can be taken as the position at which the longitudinal edge exists. The threshold in this case is empirically fixed by an experiment in accordance with the luminous contrast to be detected.

Figure 10:
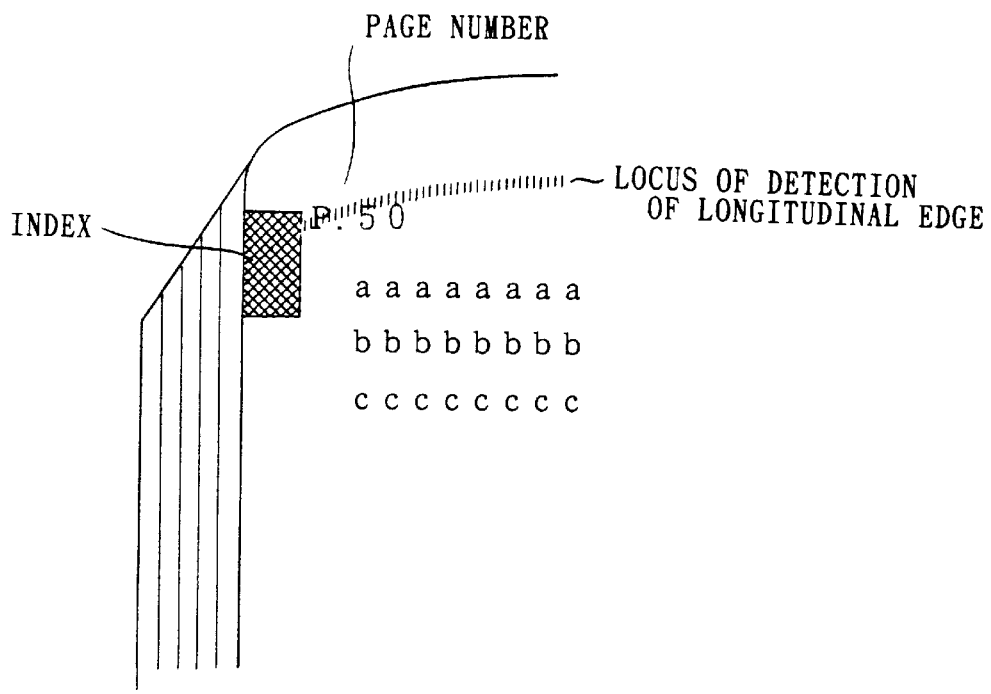
FIG. 10 is a diagram illustrating the locus of a longitudinal edge detection described during the longitudinal edge detection in the apparatus mentioned above.

Since the detection of the position of the longitudinal edge is carried out as described above, it has the possibility of detecting an index or page number placed at the end of a page as a longitudinal edge as illustrated in FIG. 10. The question whether or not the detected longitudinal edge belongs to the lateral face part of the document, therefore, is judged by finding whether or not it has a length greater than a prescribed length.

Figure 11:
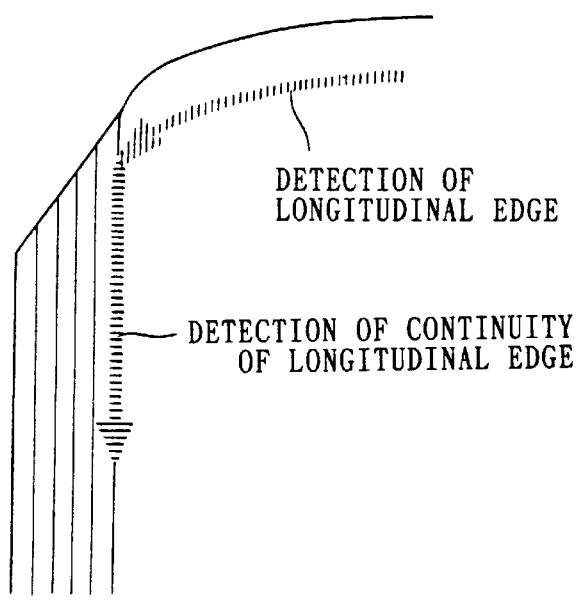
FIG. 11 is a diagram to aid in the description of the judgment of continuity of the longitudinal edge in the apparatus mentioned above.

To be specific, at the position at which the longitudinal edge is detected by moving the filter for the detection of a longitudinal edge toward the end part of the document in the auxiliary scanning direction as described above, the filter for the detection of the longitudinal edge is then moved in the main scanning direction as illustrated in FIG. 11 to examine the continuity of the detected longitudinal edge. The continuity of the longitudinal edge is judged by finding whether or not the value of differential exceeding the aforementioned threshold continues to occur for a prescribed length. When the continuity is affirmed, the longitudinal edge is admitted as a candidate for the boundary between the face part of the document and the lateral face part of the document. In contrast, when the continuity is not confined, since the possibility of the detected edge belonging to an index or a page number is high, the movement in the auxiliary scanning direction of the filter for the detection of a longitudinal edge mentioned above is resumed to continue the detection of a longitudinal edge.

The positions in the auxiliary scanning direction at which all the longitudinal edges have been detected as described above are stored as the candidates for the boundaries between the face part of the document and the lateral face part of the document in the memory 23.

Figure 12:
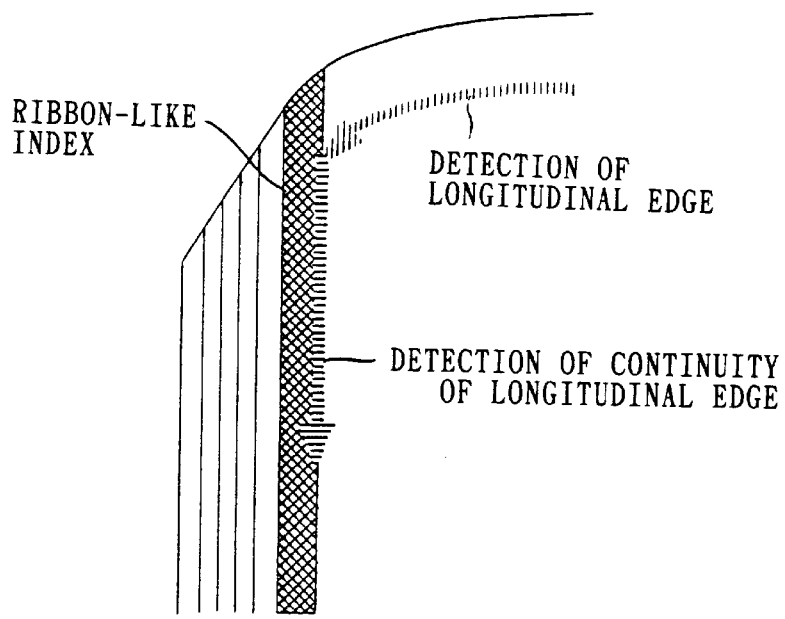
FIG. 12 is a diagram illustrating an example of the detection of a ribbon-like index based on the judgment of continuity of the longitudinal edge in the apparatus mentioned above.

The longitudinal edges, as the candidates for the boundaries, have the possibility of representing, where a ribbon-like index or a large photograph or figure is present, longitudinal edges of the index or the photograph or the figure instead of representing the boundaries between the face part of a document and the lateral face part of a document as illustrated in FIG. 12, for example. Subsequently, therefore, the longitudinal edges which actually form the boundaries between the face part of the document and the lateral face part of the document are extracted from the candidates for boundaries which have been stored in the memory 23.

Figure 13:
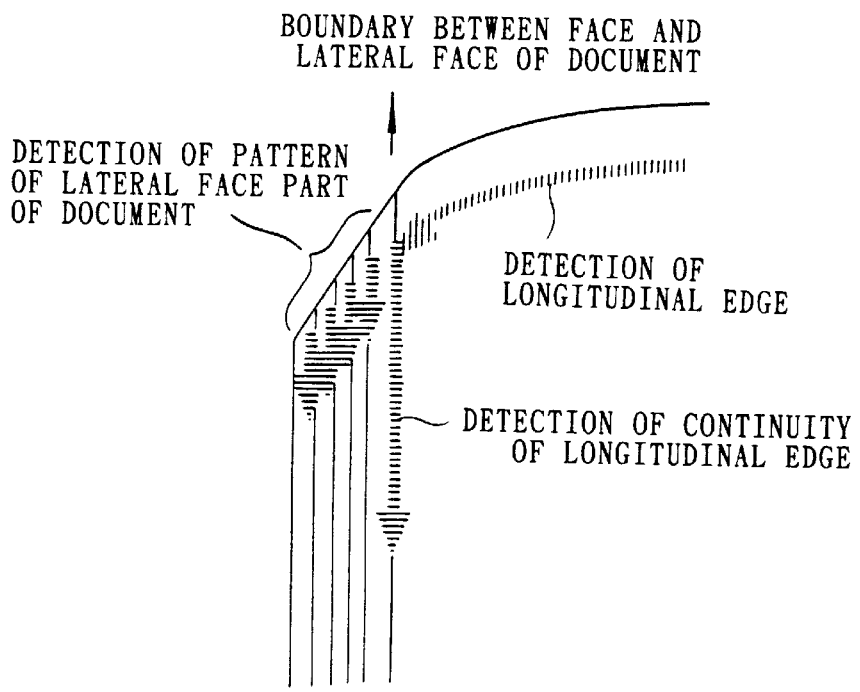
FIG. 13 is a diagram to aid in the description of the detection of a longitudinal edge pattern in the apparatus mentioned above.

Since the lateral face part of a document is in such a pattern that a plurality of longitudinal edges occur as spaced nearly evenly as illustrated in FIG. 13, patterns in which not less than a prescribed number of longitudinal edges as candidates for boundaries occur as spaced nearly uniformly are detected. The longitudinal edges as candidates for boundaries falling in that of all the detected patterns which approximates most closely the central position of the document are stored in the memory 23 as the boundary between the face part of the document and the lateral face part of the document.

The terminals of the laterally opposite face areas of the document are decided by performing the processing described above on both laterally opposite faces of the document.

The range of the face of a document to be read out as an image of the document can be decided in most cases by the processing described above. There are times, however, when the lateral face part of a document defies detection of a longitudinal edge or a pattern. For example, a case may arise in which a longitudinal edge not belonging to the lateral face part of a document (but to a ribbon-like index, figure, or photograph) can be detected and a longitudinal edge as a boundary cannot be detected. Alternatively, a case may happen in which the pattern of a longitudinal edge does not manifest itself clearly because the sheets of paper forming a book are extremely thin.

In due respect of such cases, the present embodiment admits as a boundary the position in the auxiliary scanning direction at which the position of the upper side edge or lower side edge in the main scanning direction shows an abrupt change exceeding a prescribed size.

Figure 14:
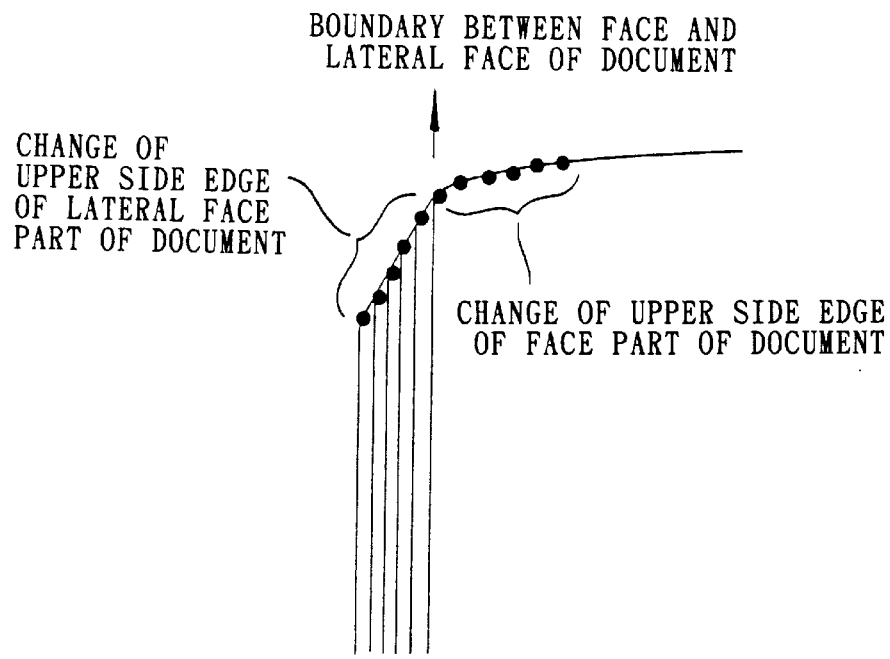
FIG. 14 is a diagram to aid in the description of the detection of an amount of change in the upper side edge in accordance with the apparatus mentioned above.
Figure 15:
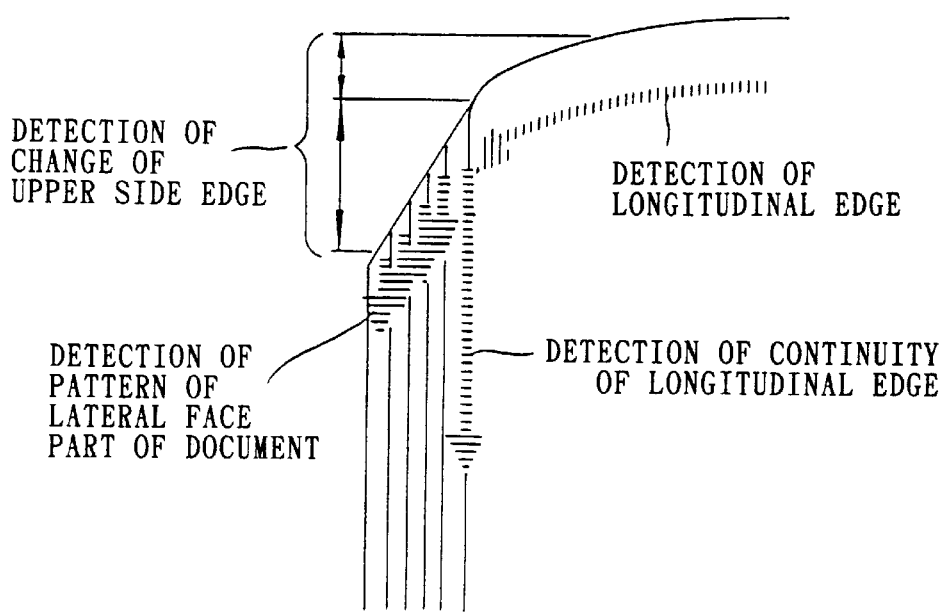
FIG. 15 is a diagram summarizing the contents of the detection of a boundary between the face part of a document and the lateral face part of the document in the apparatus mentioned above.

Though the change of the upper side edge is gradual on the face of the document as illustrated in FIG. 14 (while the embodiment offers this description with respect to the upper side edge, the same remarks hold good for the lower side edge), virtually no change of position occurs in the main scanning direction as closely viewed locally. In the boundary between the face part of the document and the lateral face part of the document, however, the change of the position is large in the main scanning direction as compared with the change on the face of the document. When the point of this large change is detected, therefore, the position of this part in the auxiliary scanning direction may be regarded as the boundary between the face part of the document and the lateral face part of the document.

When the boundary detected as described above reaches the position of the document size mentioned above or when it extends beyond the position of the document size, it is judged as involving an error of some sort or other. Eventually, the area of the document size mentioned above is decided as the image reading area during the actual scan. The contents of the three detections described above, i.e. the detection of longitudinal edge, the detection of pattern, and the detection of change of the upper side edge, are collectively illustrated in FIG. 15.

Figure 16:
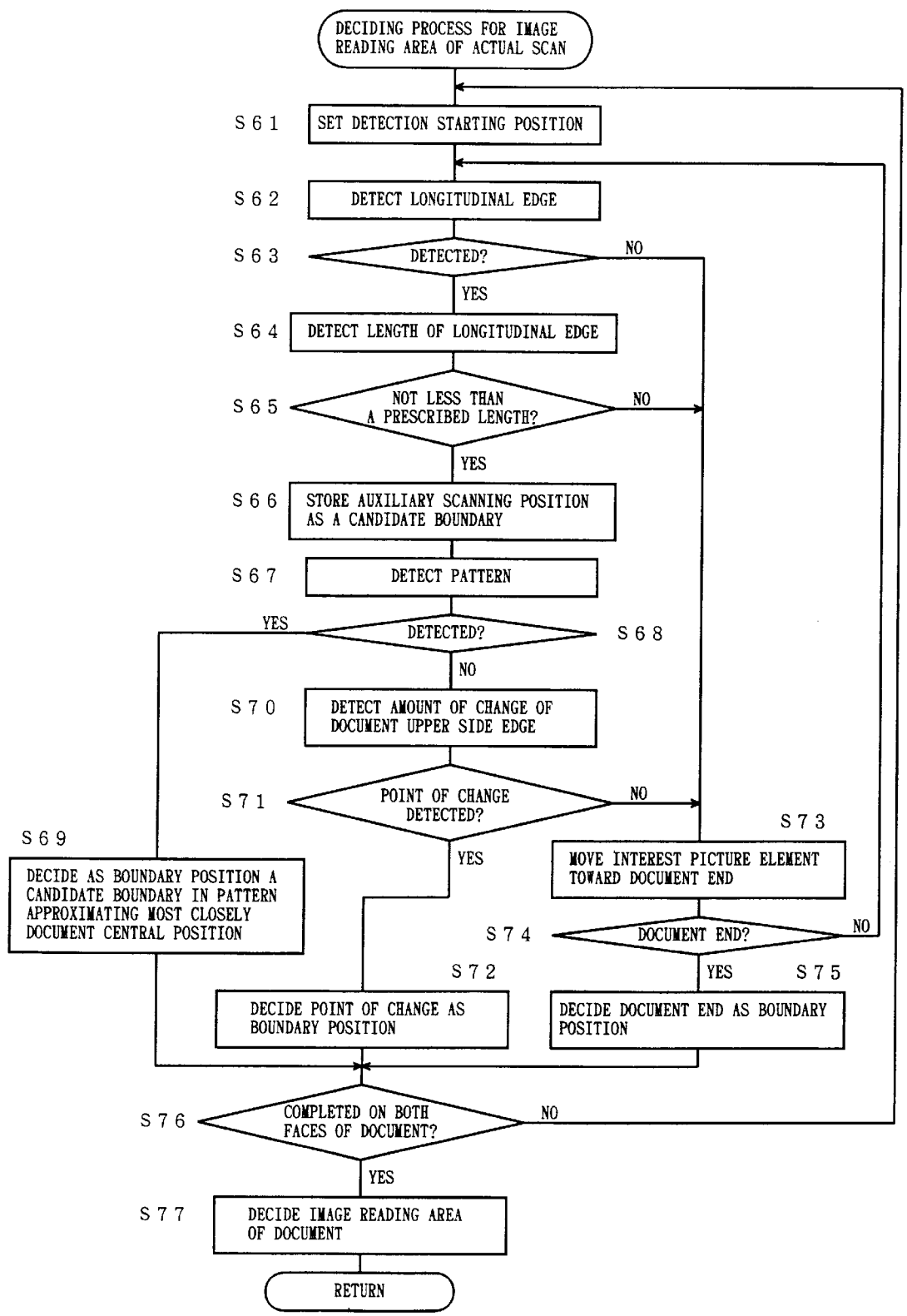
FIG. 16 is a flow chart showing the procedure of the processing of deciding an area for image reading in the apparatus mentioned above.

The process for deciding the image reading area described above will be summarized as a procedure and will be explained below with the aid of the flow chart of FIG. 16.

Initially, the coordinate of the position for starting the detection of the longitudinal edge is set (S61) and the detection of the longitudinal edge is carried out (S62). When the longitudinal edge is detected (S63, YES), the length of this longitudinal edge is detected (S64). When the longitudinal edge has a length not less than the prescribed length (S65, YES), the position of this longitudinal edge in the auxiliary scanning direction is stored in the memory 23 as a candidate for a boundary (S66).

Subsequently, the detection of pattern is carried out (S67). When such pattern is detected (S68, YES), a longitudinal edge as a candidate for a boundary which falls in that of the detected pattern which approximates most closely the central position of the document is decided as the position of the boundary between the face part of the document and the lateral face part of the document in the auxiliary scanning direction (S69).

When no pattern is detected at S68, the amount of change of the upper side edge of the document is detected (S70). When the point of a change is detected (S71, YES), the position of this point of change is decided as the position of the boundary of the face of the document in the auxiliary scanning direction (S72).

When the step S63 judges that no longitudinal edge is detectable, when the step S65 judges that the detected longitudinal edge lacks continuity, and when the step S71 judges that the point of change is not detectable, the picture element of interest is moved to the subsequent position in the auxiliary scanning direction toward the end of the document (S73) and this position is examined to decide whether or not it is the end of the document to be used during the detection of the document size (S74). When the answer is in the negative, the flow of process is returned to the step S62 and passed through the subsequent steps.

When the process up to this point fails to decide the boundary in the auxiliary scanning direction and reaches the end of the document (S74, YES), the end of the document found during the detection of the document size is decided as the boundary in the auxiliary scanning direction (S75).

When the processing described above is performed on both laterally opposite faces of the document (S76, YES), the positions of boundaries decided at the steps S69, S72, or S75 are admitted as the boundaries in the auxiliary scanning direction and the areas which have as the boundaries in the main scanning direction the upper and lower side edges found during the detection of the document size (S5) mentioned above are adopted as the image reading area during the actual scan (S77).

The image reading area to be used during the actual scan is decided by sequentially moving the picture elements of interest in the auxiliary scanning direction toward the laterally opposite ends of the document and meanwhile detecting either the pattern or the point of change of the upper side edge as described above.

This embodiment contemplates detecting the boundary between a face and a lateral face of a book document in accordance with the detection of an edge pattern in the longitudinal direction of the lateral face part of the document inclined when the book document is opened and further detecting the terminal part of the face of the document in accordance with the amount of change in the upper or lower side edge in the face part and the lateral face part of the document and, therefore, allows detection of the terminal part of the face of the document by either of the two detections mentioned above and permits exclusive production of the necessary surface image of the document as an output even when the pattern cannot be detected or when the change in the upper or lower side edge is not large as expected.

The present application is related Japanese Patent Application No. 9-097254 filed on Apr. 15, 1997 and Japanese Patent Application No. 10-88588 filed on Apr. 1, 1998 the entire disclosures of which, including specification, claims, drawings and summary, are incorporated herein by reference in their entirety.

What is claimed is:

1. An image reading apparatus for reading a book document mounted on a document stand as opened upward, comprising:

an image reading device for reading the document mounted on the document stand and producing an image as an output;

a memory device for storing the output image;

a longitudinal edge detecting device for detecting a longitudinal edge in the stored image;

a pattern detecting device for detecting a prescribed pattern formed by the detected longitudinal edge; and an image reading area deciding device for deciding an area to be read by said image reading device based on the detected pattern.

2. An image reading apparatus according to claim 1, wherein said longitudinal edge detecting device detects the longitudinal edge in the image by detecting in a lateral direction of the image a position at which luminance contrast exceeds a prescribed value.

3. An image reading apparatus according to claim 2, wherein said longitudinal edge detecting device detects the longitudinal edge in the image by detecting in the lateral direction of the image a position at which luminance contrast exceeding a prescribed value continues to exist for a length not less than a prescribed length in the longitudinal direction.

4. An image reading apparatus according to claim 1, wherein said pattern detecting device detects a pattern in which longitudinal edges in the image exist in a number not less than a prescribed number as spaced at a fixed interval.

5. An image reading apparatus according to claim 1, wherein said image reading area deciding device selects as a boundary between an image reading area and a non-image reading area a longitudinal edge that most closely approximates the center of the image among longitudinal edges present in the detected pattern.

6. An image reading apparatus according to claim 1, which further comprises:

an upper and lower edge detecting device for detecting in the image such an edge as corresponds to one of an upper side edge and a lower side edge of the book document; and a change point detecting device for detecting a point of change in the detected edge, and wherein said image reading area deciding device decides the image reading area based on the detected point of change.

7. An image reading apparatus according to claim 6, wherein said change point detecting device detects the point of change by detecting a lateral position at which an amount of change in the longitudinal direction of the detected edge in the image exceeds a prescribed amount.

8. An image reading apparatus according to claim 6, wherein said image reading area deciding device selects the detected point of change as a boundary between an image reading area and a non-image reading area.

9. An image reading apparatus according to claim 6, wherein said change point detecting device detects the point of change by detecting a lateral position at which a rate of change in the longitudinal direction of a position of the detected edge in the image exceeds a prescribed amount.

10. An image reading apparatus according to claim 1, wherein said prescribed pattern is a two dimensional matrix.

11. An image reading apparatus for reading a book document mounted on a document stand as opened upward, comprising:

an image reading device for reading the document mounted on the document stand and producing an image as an output;

a memory device for storing the output image;

an upper and lower edge detecting device for detecting in the memorized image such an edge as corresponds to one of an upper side edge and a lower side edge of the book document;

a change point detecting device for detecting a point of change in the detected edge; and an image reading area deciding device for deciding an area to be read by said image reading device based on the detected point of change.

12. An image reading apparatus according to claim 11, wherein said change point detecting device detects the point of change by detecting a lateral position at which an amount of change in a longitudinal direction of the detected edge in the image exceeds a prescribed amount.

13. An image reading apparatus according to claim 11, wherein said image reading area deciding device adopts the detected point of change as a boundary between an image reading area and a non-image reading area.

14. An image reading apparatus according to claim 11, wherein said change point detecting device detects the point of change by detecting a lateral position at which a rate of change in a longitudinal direction of a position of the detected edge in the image exceeds a prescribed amount.

15. An image reading apparatus for reading a book document mounted on a document stand as opened upward, comprising:

an image reading device for reading the document mounted on the document stand and producing an image as an output;

a memory device for storing the output image; and a boundary detecting device for detecting from the memorized image a boundary between a face part and a lateral face part of the book document, wherein said boundary detecting device is provided with a longitudinal edge detecting device for detecting a longitudinal edge in the memorized image and a pattern detecting device for detecting a prescribed pattern formed by the detected longitudinal edge, said boundary detecting device being adapted to detect the boundary between the face part of document and the lateral face part of document based on the detected pattern.

16. An image reading apparatus according to claim 15, wherein said longitudinal edge detecting device detects the longitudinal edge in the image by detecting in a lateral direction of the image, a position at which luminance contrast exceeds a prescribed value.

17. An image reading apparatus according to claim 16, wherein said longitudinal edge detecting device detects the longitudinal edge in the image by detecting in the lateral direction of the image a position at which luminance contrast exceeding a prescribed value continues to exist for a length not less than a prescribed length in the longitudinal direction.

18. An image reading apparatus according to claim 15, wherein said pattern detecting device detects a pattern in which longitudinal edges in the image exist in a number not less than a prescribed number as spaced at a fixed interval.

19. An image reading apparatus according to claim 18, wherein said boundary detecting device selects as the boundary between the face part of document and the lateral face part of document a longitudinal edge that most closely approximates the center of the image among longitudinal edges present in the detected pattern.

20. An image reading apparatus according to claim 15, wherein said boundary detecting device further comprises:

an upper and lower edge detecting device for detecting in the image such an edge as corresponds to one of an upper side edge and a lower side edge of the book document; and a change point detecting device for detecting a point of change in the detected edge, and wherein said boundary detecting device detects the boundary between the face part of document and the lateral face part of document based on the detected point of change.

21. An image reading apparatus according to claim 20, wherein said change point detecting device detects the point of change by detecting a lateral position at which an amount of change in the longitudinal direction of the detected edge in the image exceeds a prescribed amount.

22. An image reading apparatus according to claim 20, wherein said boundary detecting device adopts the detected point of change as the boundary between the face part of document and the lateral face part of document.

23. An image reading apparatus according to claim 20, wherein said change point detecting device detects the point of change by detecting a lateral position at which a rate of change in the longitudinal direction of a position of the detected edge in the image exceeds a prescribed amount.

24. An image reading apparatus according to claim 15, wherein said prescribed pattern is a two dimensional matrix.

25. An image reading apparatus for reading a book document mounted on a document stand as opened upward, comprising:

an image reading device for reading the document mounted on the document stand and producing an image as an output;

a memory device for storing the output image; and a boundary detecting device for detecting from the memorized image a boundary between a face part and a lateral face part of the book document, wherein said boundary detecting device is provided with an upper and lower edge detecting device for detecting from the memorized image such an edge as corresponds to one of an upper side edge and a lower side edge of the book document and a change point detecting device for detecting a point of change in the detected edge, said boundary detecting device being adapted to detect the boundary between the face part of document and the lateral face part of document based on the detected point of change.

26. An image reading apparatus according to claim 25, wherein said change point detecting device detects the point of change by detecting a lateral position at which an amount of change in the longitudinal direction of the detected edge in the image exceeds a prescribed amount.

27. An image reading apparatus according to claim 25, wherein said boundary detecting device adopts the detected point of change as the boundary between the face part of document and the lateral face part of document.

28. An image reading apparatus according to claim 25, wherein said change point detecting device detects the point of change by detecting a lateral position at which a rate of change in the longitudinal direction of a position of the detected edge in the image exceeds a prescribed amount.

29. A method for reading an image of a book document mounted on a document stand as opened upwardly, comprising the steps of:

reading the document mounted on the document stand and producing an image as an output;

memorizing the output image;

detecting a longitudinal edge in the memorized image;

detecting a prescribed pattern formed by the detected longitudinal edge; and deciding an area to be read by an image reading device based on the detected pattern.

30. A method for reading an image according to claim 29, wherein said step of detecting a longitudinal edge detects the longitudinal edge in the image by detecting in a lateral direction of the image a position at which luminance contrast exceeds a prescribed value.

31. A method for reading an image according to claim 30, wherein said step of detecting a longitudinal edge detects the longitudinal edge in the image by detecting in the lateral direction of the image a position at which luminance contrast exceeding a prescribed value continues to exist for a length not less than a prescribed length in the longitudinal direction.

32. A method for reading an image according to claim 29, wherein said prescribed pattern is a two dimensional matrix.

33. A method for reading an image according to claim 29, wherein said step of detecting a pattern detects a pattern in which longitudinal edges in the image exist in a number not less than a prescribed number as spaced at a fixed interval.

34. A method for reading an image according to claim 29, wherein said step of deciding an image reading area selects as a boundary between an image reading area and a non-image reading area a longitudinal edge that most closely approximates the center of the image among longitudinal edges present in the detected pattern.

35. A method for reading an image of a book document mounted on a document stand as opened upwardly, comprising the steps of:

reading the document mounted on the document stand and producing an image as an output;

memorizing the output image;

detecting in the memorized image such an edge as corresponds to one of an upper side edge and a lower side edge of the book document;

detecting a point of change in the detected edge; and deciding an image reading area based on the detected point of change.

36. A method for reading an image according to claim 35, wherein said step of detecting a point of change detects the point of change by detecting a lateral position at which an amount of change in a longitudinal direction of the detected edge in the image exceeds a prescribed amount.

37. A method for reading an image according to claim 35, wherein said step of deciding an image reading area adopts the detected point of change as a boundary between an image reading area and a non-image reading area.

38. A method for reading an image according to claim 35, wherein said step of detecting a point of change detects the point of change by detecting a lateral position at which a rate of change in a longitudinal direction of a position of the detected edge in the image exceeds a prescribed amount.

39. A method for reading an image of a book document mounted on a document stand as opened upwardly, comprising the steps of:

reading the document mounted on the document stand and producing an image as an output;

memorizing the output image;

detecting a longitudinal edge in the memorized image;

detecting a prescribed pattern formed by the detected longitudinal edge; and detecting a boundary between a face part and a lateral face part of the book document based on the detected pattern.

40. A method for reading an image according to claim 39, wherein said step of detecting a longitudinal edge detects the longitudinal edge in the image by detecting in a lateral direction of the image a position at which luminance contrast exceeds a prescribed value.

41. A method for reading an image according to claim 40, wherein said step of detecting a longitudinal edge detects the longitudinal edge in the image by detecting in the lateral direction of the image a position at which luminance contrast exceeding a prescribed value continues to exist for a length not less than a prescribed length in the longitudinal direction.

42. A method for reading an image according to claim 39, wherein said step of detecting a pattern detects a pattern in which longitudinal edges in the image exist in a number not less than a prescribed number as spaced at a fixed interval.

43. A method for reading an image according to claim 42, wherein said step of detecting a boundary between a face part and a lateral face part of the book document selects as the boundary between the face part of document and the lateral face part of document a longitudinal edge that most closely approximates the center of the image among longitudinal edges present in the detected pattern.

44. A method for reading an image according to claim 39, wherein said prescribed pattern is a two dimensional matrix.

45. A method for reading an image of a book document mounted on a document stand as opened upwardly, comprising the steps of:

reading the document mounted on the document stand and producing an image as an output;

memorizing the output image;

detecting from the memorized image an edge that corresponds to one of an upper side edge and a lower side edge of the book document;

detecting a point of change in the detected edge; and detecting a boundary between a face part and a lateral face part of the book document based on the detected point of change.

46. A method for reading an image according to claim 45, wherein said step of detecting a point of change detects the point of change by detecting a lateral position at which an amount of change in the longitudinal direction of the detected edge in the image exceeds a prescribed amount.

47. A method for reading an image according to claim 45, wherein said step of detecting a boundary between a face part and a lateral face part of the book document selects the detected point of change as the boundary between the face part of document and the lateral face part of document.

48. A method for reading an image according to claim 45, wherein said step of detecting a point of change detects the point of change by detecting a lateral position at which a rate of change in the longitudinal direction of a position of the detected edge in the image exceeds a prescribed amount.

\* \* \* \* \*